Nov. 27, 1923.

R. H. UPSON

AIRSHIP 1,475,210

Original Filed Nov. 26, 1919      6 Sheets-Sheet 1

Inventor
Ralph H. Upson

By
his Attorney

Nov. 27, 1923.

R. H. UPSON

AIRSHIP 1,475,210

Original Filed Nov. 26, 1919      6 Sheets-Sheet 3

Ralph H. Upson

Nov. 27, 1923.  R. H. UPSON  1,475,210
AIRSHIP
Original Filed Nov. 26, 1919   6 Sheets-Sheet 5

Ralph H. Upson

Nov. 27, 1923.
R. H. UPSON
AIRSHIP
Original Filed Nov. 26, 1919

Inventor
Ralph H. Upson
By C. F. Sandon
his Attorney.

Patented Nov. 27, 1923.

1,475,210

UNITED STATES PATENT OFFICE.

RALPH H. UPSON, OF AKRON, OHIO, ASSIGNOR TO THE GOODYEAR TIRE & RUBBER COMPANY, OF AKRON, OHIO, A CORPORATION OF OHIO.

AIRSHIP.

Application filed November 26, 1919, Serial No. 340,763. Renewed May 21, 1921. Serial No. 471,488.

*To all whom it may concern:*

Be it known that I, RALPH H. UPSON, a citizen of the United States, and resident of Akron, Ohio, have invented new and useful Improvements in Airships, of which the following is a specification.

The present invention relates to improvements in airships and more particularly to airships of the non-rigid type, and comprises, among other features, an improvement in the structure forming the subject matter of my Patent No. 1,375,242, granted Apr. 19, 1921.

The principal objects of the present invention are primarily the production of an airship of the non-rigid type possessed of certain refinements of construction, and improvement in arrangement of parts, which taken together with those highly desirable features of said copending application, included in my present construction, combine to produce an airship that is more flexible, safe and practical, and hence capable of a wider range of action.

Other objects and advantages will become readily apparent when the following description is read in conjunction with the accompanying drawings, wherein.

The airship contemplated by my present invention preferably includes certain combinations and elements which, although they are all interrelated and operate in conjunction with each other to produce and control my present improvements, may be divided, for the purpose of description, as follows: A, envelope structure; B, cars, motive-power, and empennage; C, air control; D, gas control.

A. Envelope structure.

Figure 1:
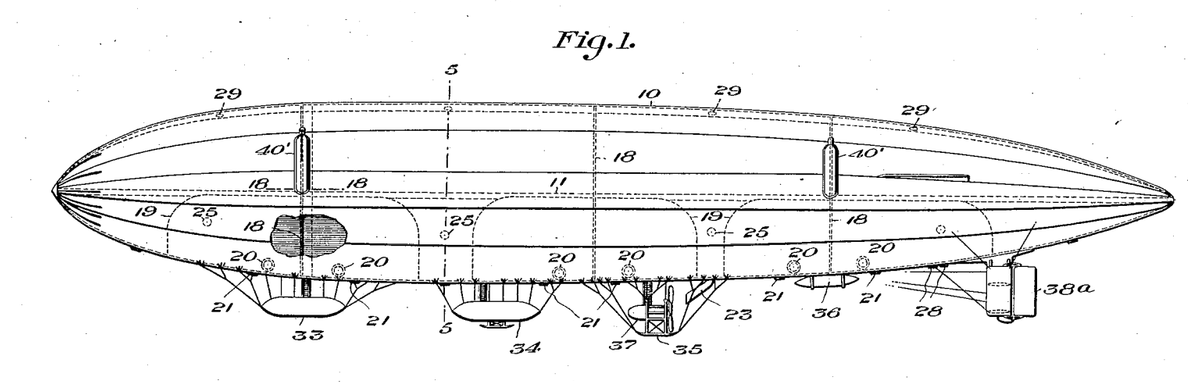
Figure 1, is a side elevation of an airship illustrating my improved construction and with parts broken away and shown in section.
Figure 2:
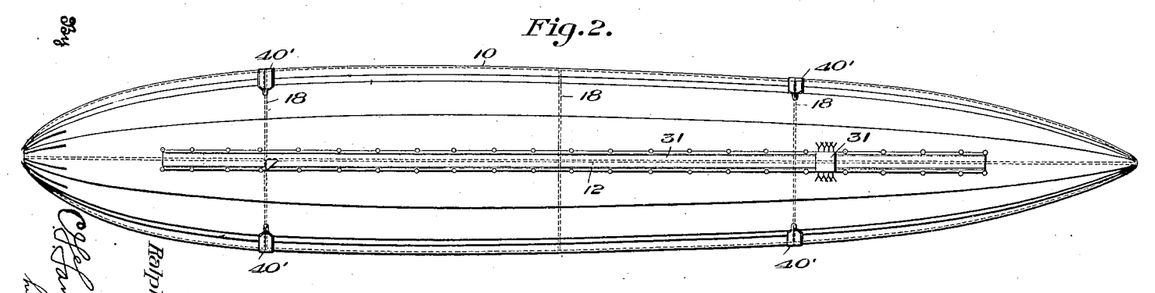
Figure 2, is a top plan view thereof.
Figures 3, 4, 12, 13, 14:
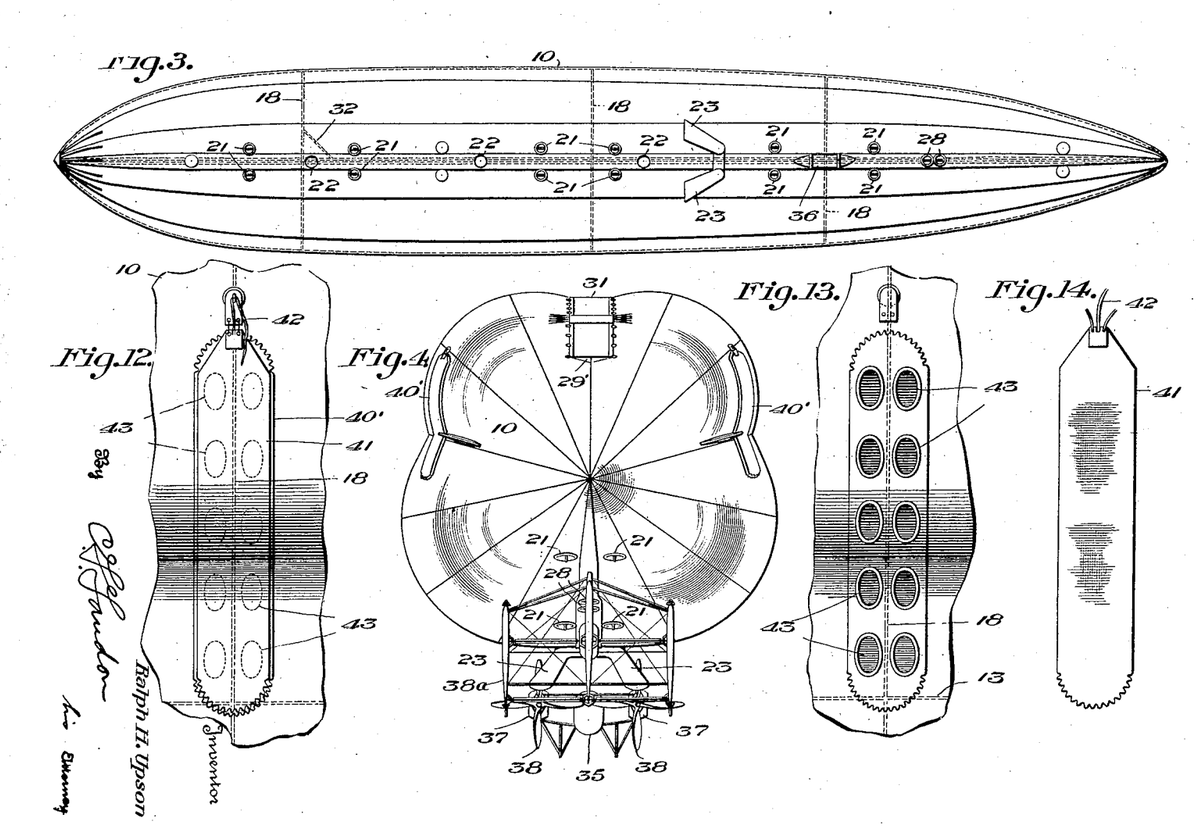
Figure 3 is a bottom plan view.
Figure 4 is a rear elevation on an enlarged scale.
Figures 12, 13 and 14 are enlarged elevations illustrating the construction of a gas releasing device.
Figure 5:
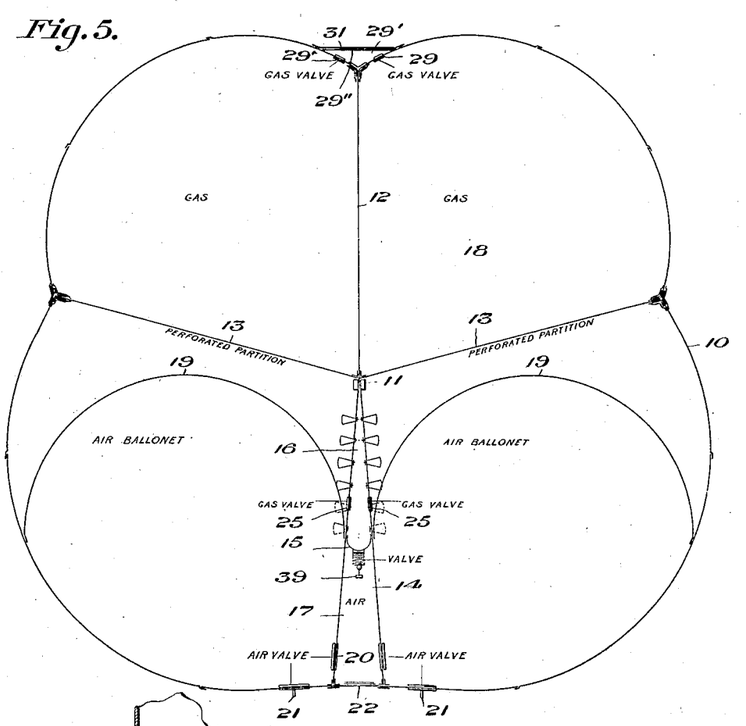
Figure 5 is a diagrammatic transverse sectional view taken on the line 5—5 of Figure 1.
Figures 6, 7:
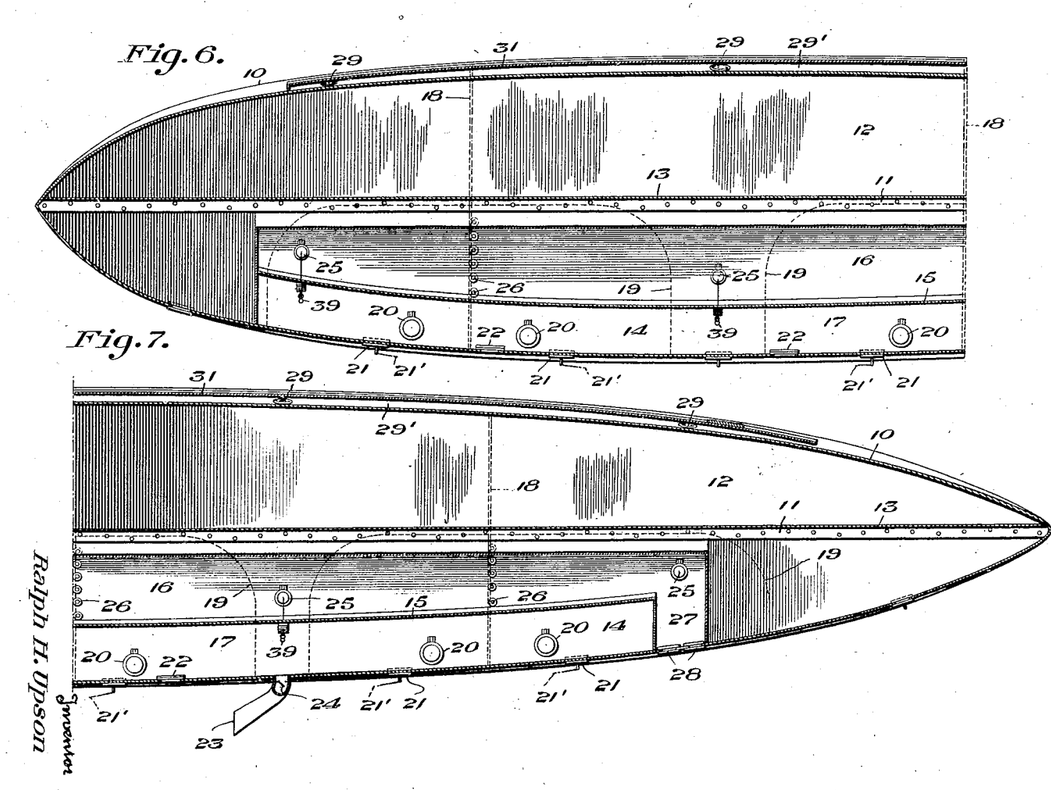
Figure 6 is a vertical longitudinal sectional view on an enlarged scale of the forward half portion of the device as shown in Figure 1.
Figure 7 is a similar view of the rear half portion.
Figure 10:
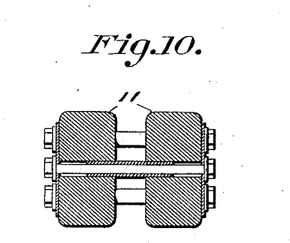
Figure 10 is an enlarged transverse section of the compression member.
Figure 11:
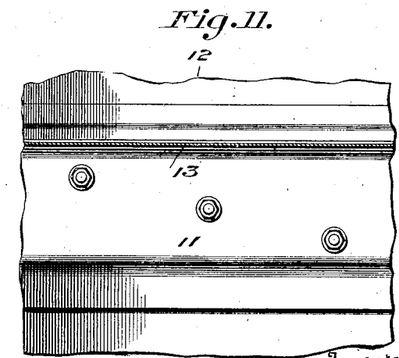
Figure 11 is a fragmentary side elevation of the device shown in Figure 10.
Figure 15:
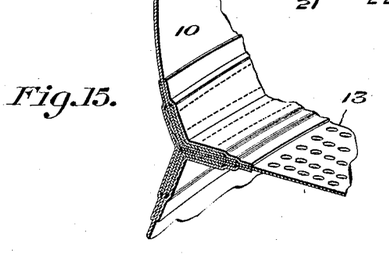
Figure 15 is a fragmentary perspective view on an enlarged scale, illustrating the manner of connecting the substantially horizontal diaphragm with the envelope.
Figure 16:
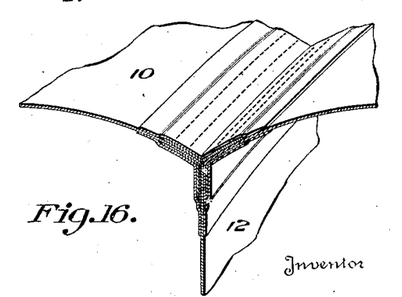
Figure 16 is a similar view illustrating the manner of connecting the vertical diaphragm to the envelope.
Figure 17:
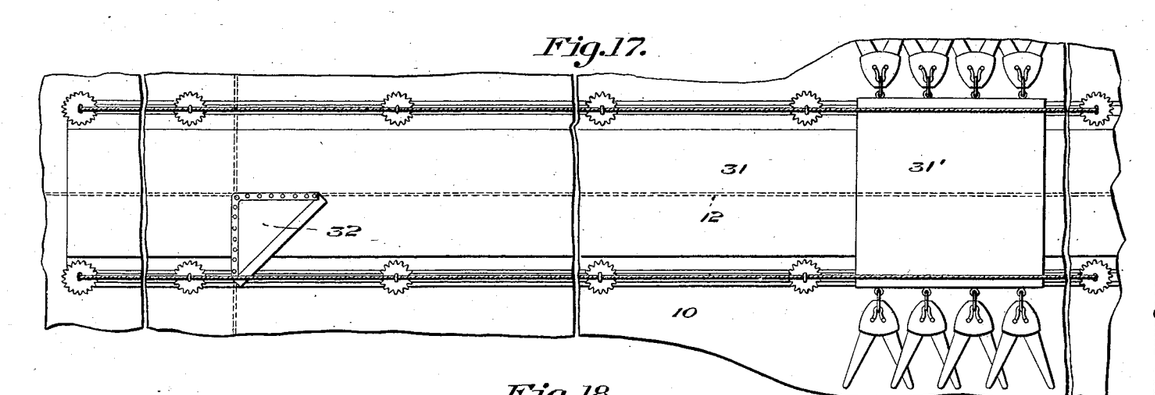
Figure 17 is an enlarged top plan view with parts broken out, illustrating the construction at the top of the airship.

Referring to the drawings and more particularly to Figures 1, 2 and 3, the numeral 10 designates the envelope which may be formed of fabric, rubberized or otherwise treated, in the usual manner. Running along the approximate longitudinal center line of the envelope and extending from the tip of the tail to the point of the nose is a single compression member or bracing spar 11. This member is, in this instance, formed in two parts each of which is mounted upon one side of a substantially vertical diaphragm 12, and which parts are bolted together through the diaphragm, see Figures 10 and 11. Substantially horizontal foraminous diaphragms 13 are also provided, the outer edges of which are secured to the envelope, see Figure 15, while their inner edges are clamped between the two halves of the compression member 11.

The upper portion of the vertical longitudinal partition or diaphragm 12 is preferably formed of gas tight material, and is so arranged as to divide the upper half of the envelope along its longitudinal center. The lower portion of the diaphragm 12 is split or divided, thereby forming an A-shaped chamber 14, the bottom of the A being substantially of the width to permit the passage of a man for the greater portion of the length of the envelope. Like the upper half of the diaphragm, the lower half also is made of gas tight material and divides the lower portion of the envelope along its longitudinal center.

A flexible diaphragm 15 suspended horizontally across the chamber 14 and secured to the sides thereof divides the chamber 14 into upper and lower passages 16 and 17 respectively.

To prevent the accumulation of gas pressure at the high end when the envelope is tilted, I employ a series of transverse vertical gas tight partitions 18, which divide the envelope into distinct compartments. I also provide a series of ballonets 19. In this instance I have illustrated six of them, which are connected to the outside of the walls of the chamber 14 at the junction of the flexible diaphragm 15 to the chamber walls and to the envelope proper. As customary, the ballonets are inflated and controlled by air and for this purpose I propose to utilize the lower passage 17 as an air manifold for distributing air to the different ballonets as well as for a passage for men. I, therefore, provide a plurality of suitable air valves 20 along the lower portions of the passage walls, which valves are controlled in a manner later to be described. To permit ready access to the passage by the occupants, manholes 22, provided with suitable covers to make them airtight, are distributed in the bottom of the envelope 10 and in line with said passage 17. To provide a means of exhaust for the ballonets, air valves 21 are arranged in the envelope 10 adjacent the passage 17 which air valves are controlled by the pilot. Air under pressure is supplied to the passageway 17 by means of an air scoop 23 suspended below said passage 17 at a point just behind the propellers of the engines, see Figure 4. The passage of the air through this scoop is controlled by a damper valve 24 operable in any suitable manner from the pilot's car.

Figure 8:
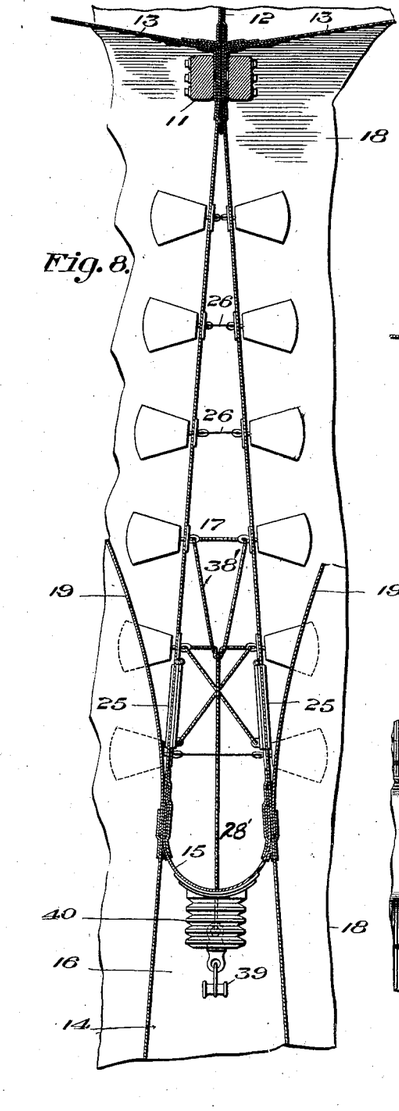
Figure 8 is a fragmentary transverse sectional view on a still further enlarged scale, illustrating the central air and gas passages.
Figure 9:
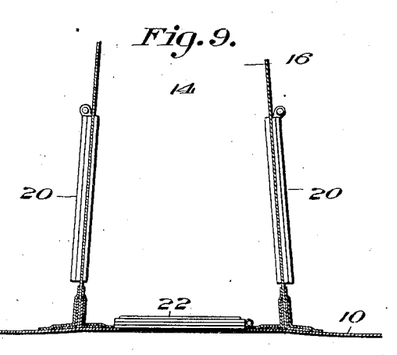
Figure 9 is a similar view illustrating one of the manholes.

The upper passage 16 of the chamber 14 is preferably used as a gas manifold, and gas valves 25 are, therefore, located in the side walls thereof and operated in a manner later to be described. To prevent the bulging and contracting of the walls of the passage I provide bracing members 26 distributed along the passage, as clearly seen in Figure 8. The rear end of the gas passage 16 is extended beyond the air passage 17 and is projected downwardly to the envelope, thereby producing a communicating passage 27 between the gas passage and the envelope. A pair of gas valves 28 are incorporated in the envelope at the mouth of this passage and provide an outlet or discharge for the gas.

From the foregoing it will be seen that by the use of the gas valves 28 the passage 16 may slowly or quickly be discharged of gas and to further provide a discharge for the individual compartments, pairs of gas valves 29 are located in the top of the envelope, one on each side of the vertical diaphragm, and in the indent or V-shaped depression formed by the attachment of the diaphragm to the envelope. These valves when operated, discharge the gas into a passageway or duct 29', the rear end of which is open, and which is formed by spanning the V shaped depression in the envelope, with a strip of fabric 29''.

Figures 18, 19:
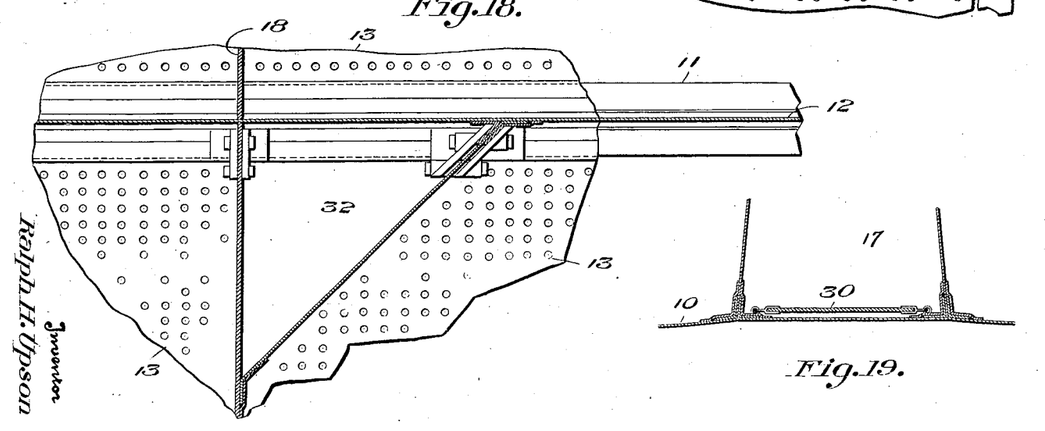
Figure 18 is an enlarged horizontal sectional detail view, illustrating a portion of the device.
Figure 19 is a detail transverse sectional view showing a portion of the central air passage.

To protect the envelope from the feet of the crew a strip of heavy duck 30 or other material is stretched across the floor of the chamber 17 and elevated from the floor a slight distance in a manner shown in Fig. 19. There is also provided along the top of the envelope a similar walk 31 which spans the strip of fabric 29'' forming the gas outlet chamber or duct 29'. The object of this platform or walk 31 is to permit the mounting of guns, etc., as at 31', or for the manual control or inspection of the valves 29. The walk is reached by a passage 32 formed at the junction of the forward transverse partition 18 and the vertical partition or diaphragm 12 which passage communicates with one of the manholes 22, and the air passage 17 at the bottom of the balloon envelope. A manhole is provided at the top of the passage 32 which is provided with a suitable cover to effectively seal the passage against the escape of air therefrom.

*B. Cars, motive-power, and empennage.*

Any desired arrangement of cars, motor-mounting and fuel tanks, may be used, for instance, that shown in the drawings. Here I have shown three cars, designated as 33, 34 and 35, and an extra fuel tank 36 mounted in succession under the envelope. The pilot's car is forward. The car for the extra crew, extra fuel, provisions, etc., is second in order, and the mechanic's car supporting the engines is next, while a large fuel tank or tanks which are mounted close up to the envelope are last, or between the mechanic's car and the empennage. These cars, etc., may be suspended from the envelope or mounted in any suitable manner, and outside of the fact that they form part of the airship as a whole, they need not be considered as essential details. The manholes 22 are located directly over the cars, and are reached by ladders, ropes or other desired means.

The power plant proper in this instance consists of two engines 37 driving propellers 38, of the pusher type, and in the car is to be found lubricating tanks, gasoline service tanks, instruments and all equipment necessary for the running of the engines.

The construction and arrangement of the gas and air compartments, ballonets, valves, etc., have previously been described in conjunction with the general description of the balloon and there remains to be described the operation and control thereof.

C. Air control.

I have found in practice that airships embodying my proposed improvements can be controlled almost entirely by the rudders and elevators, a preferred type of which is illustrated generally at 38ᵃ, because the center of gravity is located so high that the ballonets need not ordinarily be used for balancing, and therefore, very little air manipulation is needed, hence, I have not complicated the control by running operating cords from the air valve 20 to the pilot's car. However, should it be desired to increase the pressure in one or more of the ballonets, the damper valve 24 in the scoop may be opened permitting the air to enter the chamber 17. One of the crew, at a signal from the pilot, will then manually open the correct valves or valve 20 to the ballonets until the correct pressure is obtained. To decrease the pressure one or more of the valves 21 are opened by manipulation of the valve cords 21' which lead to the car. In connection with the foregoing I wish it to be understood that should it be desired to control the operation of the air valves 20 from the pilot's car, suitable cords can be arranged to do so.

D. Gas control.

The internal gas valves 25 are very delicately set, a slight pressure tending to close them so that they merely act as check valves to prevent the gas from constantly surging from one compartment to another, and when the discharge valves 28 (in the rear end passage 27) are opened, either automatically or by hand, the gas immediately flows out of whichever compartments are under the highest pressure, the pressure being thereby automatically equaled therein.

Means for manually operating the gas valves 25 from the passage 17 are provided and function as follows: Each of the gas compartments have a gas valve 25 and in the present arrangement are located in pairs on opposite sides of the gas passage 16 (see Fig. 8), each pair being connected by a bridle 38', whereby a pull upon the bridle will operate both valves simultaneously. The bridle cord 28' is carried downward through the dividing diaphragm 15 and terminates in a suitable hand grip 39. In order to prevent the escape of gas around the bridle cord 28' and keep a tight joint at all times, I provide a bellows construction 40 around the cord, one end of which is open and is cemented or otherwise secured to the diaphragm 15, the other end being closed around the bridle cord 28'. Any movement of the cord 28' will expand or contract the bellows keeping a tight joint and at the same time permitting a flexible control of the valves. The springs provided in the valves 25 retain the valves in a closed position as is desired.

Although, as before stated, the primary function of the valves 25 is to automatically equalize the gas pressure in the various compartments and the passage 16, these valves may be manipulated to transfer gas from a selected compartment to another compartment on the opposite side of the passage-way 16, or upon the same side, if desired. This operation becomes necessary at times in trimming ship, or under other circumstances readily understood in the art, and may be accomplished in the following manner. The ballonet 19, associated with the compartment from which it is desired to discharge gas, is first manipulated by increasing the pressure therein to compress the gas in the selected compartment. The increased air pressure necessary to manipulate the ballonet is procured through means previously described, i. e., the scoop 23 and the valve 20. The compression of the gas in the selected compartment forces a portion of the gas into the passage-way 16 through the associated valve 25, thus raising the pressure in the passage-way. At this stage the ballonet 19 associated with the compartment in which it is desired to introduce the raised pressure, should, preferably, be deflated. The proper valve 25 may then be opened by means of the hand grip 39 and gas from the chamber 16 will flow into the compartment associated with the deflated ballonet. This operation may be accomplished either when the pressure in a certain compartment falls below that in the passage-way 16 or when the pressures in the various compartments and passage-way are equal. Although the valves are arranged to be opened in pairs, it will readily be understood that during this operation the excess pressure in the passage-way 16 may be prevented from flowing back into the compartment opposite to that into which it is desired to be introduced by manipulating the pressure in the proper ballonet to prevent such back flow in that compartment.

Thus, it will be seen that with my present construction a very efficient gas control is provided, the gas passage 16 serving either as a common distributing, a discharging duct or a supply manifold as desired, while the passage 29' serves as an emergency discharge passage. The gas valves 29 located in the passage 29' are controlled by wires or other suitable means from the pilot's car, to discharge the gas into the passage 29' which gas flows out of the rear end of said passage away from all danger of ignition from the engines.

Should it be desired to discharge the gas passage 16, the pilot will manipulate the control wires to the exhaust valves 28 in the communicating passage 27, as will be readily understood.

Additional means for releasing the gas to deflate the balloon are provided at 40' which means consist of rip panels 41, cemented or sewed upon the balloon and operable by pull cords 42. It will be noted that each rip panel 41 serves normally to close a series of gas outlets 43 in the envelope 10, and upon each side of one of the partitions 18. By virtue of this construction, gas may be released from two adjacent compartments by pulling upon a cord 42, and ripping a panel 41 from its fastening upon the balloon envelope.

Although I have illustrated and described my proposed improvements in more or less diagrammatic manner it is to be clearly understood that certain refinements of construction, as well as other arrangements of the various parts, may be made without departing from the spirit of the invention, or the scope of the appended claims.

What I claim is:

1. In a balloon, the combination with a gas-containing portion, an air-containing portion, and a flexible envelope encasing said portions, of a fluid conducting chamber extending longitudinally of the envelope and divided into a gas-supplying compartment and an air-supplying compartment, means for establishing communication between the gas containing portion of the balloon and the gas supplying compartment, and means for establishing communication between the air-containing portion of the balloon and the air-supplying compartment.

2. In an airship embodying an envelope divided into compartments and including a plurality of ballonets, an axial compression member extending between the nose and stern of the ship, a partition connecting the compression member with the keel of the ship throughout the greater portion of its length, said partition comprising spaced walls forming a chamber therebetween, a second partition dividing the chamber, means for establishing communication between the ballonets and one division of the chamber, and means for establishing communication between the other division of the chamber and the compartments.

3. The combination with a balloon embodying a flexible envelope, of a fluid-conducting chamber extending longitudinally of the balloon, independent fluid compartments disposed on each side of the chamber, and means operated by differential pressures in the chamber and the compartments for admitting fluid from the compartments into the chamber.

4. In an airship including a flexible envelope, a vertical flexible partition dividing the envelope along its longitudinal center, said partition being split below the major axis of the envelope to form a fluid conducting chamber, and means for admitting fluid from the chamber into the envelope.

5. In an airship including a flexible envelope, a vertical flexible partition dividing the envelope along its longitudinal center, said partition being split below the major axis of the envelope to form a fluid conducting chamber, and means automatically operable in one direction for admitting fluid from the chamber into the envelope.

6. In an airship including a flexible envelope, a vertical flexible partition dividing the envelope along its longitudinal center said partition being split below the major axis of the envelope to form a fluid conducting chamber, a partition for dividing the chamber into upper and lower passageways, ballonets upon each side of the chamber, means for admitting fluid from one passageway into the envelope, and means for admitting fluid from the other passageway into the ballonets.

7. In an airship including a flexible envelope, a vertical flexible partition dividing the envelope along its longitudinal center said partition being split below the major axis of the envelope to form a fluid conducting chamber, a partition for dividing the chamber into upper and lower passageways, ballonets upon each side of the chamber, means automatically operable in one direction for admitting fluid from the envelope into one passage and means for admitting fluid from the other passageway into the ballonets.

8. The combination with an airship of the non-rigid type, including an envelope divided transversely into a plurality of fluid compartments, said envelope having a longitudinal bracing spar disposed centrally therein, of a flexible, fluid-tight, vertical diaphragm dividing the envelope along its longitudinal center, said diaphragm being divided below the spar to form a central chamber, means for admitting gas into the compartments, means associated with said central chamber to increase or diminish the gas pressure in a selected compartment, means associated with said central chamber for equalizing the gas pressure between the compartments, and a relief valve for each gas compartment for releasing the gas therefrom.

9. The combination with an airship of the non-rigid type, including an envelope divided transversely into a plurality of fluid compartments, said envelope having a longitudinal bracing spar disposed centrally therein, of a flexible, fluid-tight, vertical diaphragm dividing the envelope along its longitudinal center, said diaphragm being divided below said bracing spar, to form a central chamber, a flexible foraminous diaphragm dividing the envelope horizontally along its median line, means for admitting gas into the compartments, means associated with said central chamber to increase or diminish the gas pressure in a selected compartment, means associated with said central chamber for equalizing the pressure between the gas compartments, and a relief valve for each gas compartment for releasing the gas therefrom.

10. The combination with an airship of the non-rigid type including an envelope divided transversely into a plurality of fluid compartments, said envelope having a longitudinal bracing spar disposed centrally therein, of a flexible, fluid-tight, vertical diaphragm dividing the envelope along its longitudinal center, said diaphragm being divided below said spar to form a central chamber, a flexible diaphragm dividing said chamber horizontally into a gas passage and an air manifold, means for admitting gas into the compartments, means associated with said air manifold to increase or diminish the gas pressure in a selected compartment, a valve between each gas compartment and the gas passage for automatically equalizing the pressure between the said compartments and said passage, and a relief valve for each gas compartment for releasing the gas therefrom.

11. The combination with an airship of the non-rigid type comprising, an envelope, divided transversely into a plurality of fluid compartments, said envelope having a longitudinal bracing spar disposed centrally therein, of a flexible, fluid-tight, vertical diaphragm dividing said envelope along its longitudinal center, said diaphragm being divided below said spar, to form a central chamber, a flexible diaphragm dividing said chamber horizontally into a gas passage and an air manifold, a flexible foraminous diaphragm dividing the envelope horizontally along its median line, valves for admitting gas to the compartments, means associated with said air manifold to increase or diminish the gas pressure in a selected compartment, a valve between each gas compartment and the gas passage for automatically equalizing the pressure between said compartments and said passage, and a relief valve for each gas compartment for releasing the gas therefrom.

12. The combination with an airship of the non-rigid type comprising, an envelope, divided transversely into a plurality of fluid compartments, said envelope having a longitudinal bracing spar disposed centrally therein, of a flexible, fluid-tight, vertical diaphragm dividing said envelope along its longitudinal center, said diaphragm being divided below said spar to form a central chamber, a flexible diaphragm dividing said central chamber into a gas passage and an air manifold, flexible bracing means radiating from said spar to said envelope, valves for admitting gas to the compartments, ballonets in said compartments, and upon each side of the air manifold, an air intake for the air manifold, valves for admitting air from the manifold to the ballonets, to regulate the pressure of the gas in a selected compartment, relief valves for the ballonets for exhausting the air therefrom, valves between the gas compartments and the gas passage for equalizing the pressure between the compartments, and a relief valve for each compartment for releasing the gas therefrom.

13. The combination with an airship of the non-rigid type including, an envelope, divided transversely into a plurality of fluid compartments, said envelope having a longitudinal bracing spar disposed centrally therein, of a flexible, vertical, fluid-tight diaphragm dividing said envelope along its longitudinal center, said diaphragm being divided below said spar to form a central chamber, a second flexible diaphragm dividing said chamber horizontally into a gas passage and an air manifold, flexible bracing elements connecting the spar to the envelope, valves for admitting gas to the compartments, an intake for the air manifold, valves for releasing air from said manifold, ballonets in the compartments and upon each side of the air manifold, valves for admitting air from said manifold into said ballonets whereby the pressure of the gas in a selected compartment is regulated, relief valves for the ballonets for releasing the air therefrom, valves between the compartments and the gas passage for equalizing the pressure between the compartments, a diaphragm spanning the spine of the envelope and forming therebetween a gas exhaust conduit, open at its rear end, and relief valves operable to exhaust the compartments into said conduit.

14. The combination with an airship of the non-rigid type, including an envelope, divided transversely into a plurality of fluid compartments, said envelope having a longitudinal bracing spar disposed centrally therein, of a flexible, vertical, fluid-tight diaphragm dividing said envelope along its longitudinal center, said diaphragm being divided below said spar to form a central chamber, a substantially horizontal foraminous diaphragm dividing the envelope along its median line, a second flexible diaphragm dividing the central chamber horizontally into a gas passage and an air manifold, valves for admitting gas to the compartments, an intake for the air manifold, valves for releasing air from said manifold, ballonets in the compartments and upon each side of the air manifold, valves operable to admit air from the manifold to the ballonets whereby the pressure of the gas in a selected compartment is regulated, a relief valve for each ballonet for releasing the air therefrom, an automatically operating valve between each compartment and the gas passage whereby the pressure between the compartments and the gas passage is equalized, a diaphragm spanning the spine of the envelope and forming therebetween a gas exhaust conduit open at its rear end, relief valves operable to exhaust the compartments into said conduit, and means for manually controlling said automatically operating valves.

15. The combination with an airship of the non-rigid type including, an envelope divided transversely into a plurality of compartments, said envelope having a longitudinal bracing spar disposed centrally therein, of a flexible, vertical, diaphragm dividing said envelope along its longitudinal center, said diaphragm being divided below said spar to form a central chamber, a flexible foraminous diaphragm dividing the envelope horizontally, a second flexible diaphragm dividing the central chamber horizontally into a gas passage and an air manifold, said air manifold having manholes therein, valves for admitting gas to the compartments, an intake for the air manifold, valves for releasing air from said manifold, ballonets in the compartment disposed upon each side of the manifold, valves operable to admit air from the manifold to the ballonets whereby the pressure of the gas in a selected compartment is regulated, a relief valve for each ballonet for releasing the air therefrom, an automatically operating valve between each compartment and the gas passage, a partition spanning the spine of the envelope and forming therebetween an exhaust conduit open at its rear end, relief valves operable to exhaust the compartment into said conduit, and means for manually controlling said automatically operating valves whereby the pressure in the compartments is equalized.

16. The combination with an airship of the non-rigid type including an envelope divided transversely into a plurality of compartments, said envelope having a longitudinal bracing spar disposed centrally therein, of a flexible, vertical, diaphragm dividing said envelope along its longitudinal center, said diaphragm being divided below said spar to form a central chamber, a flexible foraminous partition dividing the envelope horizontally, whereby the sides of said envelope are suspended from the spar, a second flexible diaphragm dividing said central chamber horizontally into a gas passage and an air manifold, valves for admitting gas to the compartments, an air intake for the manifold, valves for releasing air from said manifold, ballonets in the compartments, valves operable to admit air from the manifold to the ballonets, whereby the gas pressure is regulated in a selected compartment, a relief valve for each ballonet for releasing air therefrom, an automatically operating valve between each compartment and the gas passage, a diaphragm spanning the spine of the envelope, and forming therebetween an exhaust conduit open at its rear end, relief valves operable to exhaust the compartments into said conduit, means for manually controlling said automatically operating valves from within the air manifold, whereby the pressure is equalized in the gas compartments, an enclosed companionway connecting the air manifold with the top of the envelope, and a plurality of emergency deflating valves upon the envelope, each valve being constructed to release the gas simultaneously from two adjoining compartments.

17. An airship of the non-rigid type comprising, a main enevelope forming a main fluid compartment, a longitudinal compression member disposed centrally within the envelope, a plurality of flexible partitions dividing the main fluid compartment into a plurality of smaller compartments, said partitions acting to suspend all parts of the envelope from the compression member, a centrally disposed chamber running lengthwise of the envelope, means associated with said chamber to increase or diminish pressure within any selected smaller compartment, means associated with said centrally disposed chamber for equalizing the pressure between said compartments, and means for deflating each compartment independently.

18. An airship of the non-rigid type comprising, an envelope forming a main fluid compartment, a longitudinal compression member disposed centrally within the envelope, flexible partitions dividing the main fluid compartment transversely into smaller compartments, a vertical flexible diaphragm bisecting each smaller compartment and serving to attach the spine and belly of the envelope to the compression member, said vertical diaphragm being split below the compression member to form a central chamber, flexible foraminous diaphragms upon each side of the vertical diaphragm, said last diaphragms serving to connect the sides of the envelope to the compression member, means associated with said central chamber to increase or diminish pressure in a selected smaller compartment, means within said central chamber for equalizing the pressure between said smaller compartments, means for manually controlling said last means, and a relief valve for deflating each compartment when desired.

19. An airship of the non-rigid type comprising an envelope forming a main fluid compartment, a longitudinal compression member disposed centrally within the envelope, flexible partitions dividing the main compartment into smaller compartments, a vertical flexible diaphragm bisecting each smaller compartment and attaching the spine and belly of the envelope to the compression member, said vertical diaphragm being split below the compression member to form a central chamber, flexible means dividing said central chamber horizontally into a gas passage and an air manifold, flexible foraminous diaphragms upon each side of the vertical diaphragm connecting the sides of the envelope to the compression member, means associated with said air manifold to increase or diminish the pressure in a selected smaller compartment, means within said gas passage operable to automatically equalize the pressure between the smaller compartments and the gas passage, means for manually controlling said last means to equalize the pressure between the compartments, a relief valve for deflating each smaller compartment, and a plurality of emergency valves upon the envelope, each of which valves is constructed to release the pressure simultaneously from two adjoining compartments.

20. In an airship embodying an envelope divided into compartments and including a plurality of ballonets, a longitudinal flexible partition extending from the major axis of the envelope to the keel thereof, said partition comprising spaced relatively converging walls forming a chamber therebetween, a second partition dividing the chamber, means for establishing communication between the ballonets and one division of the chamber, and pressure actuated means for establishing communication between the other division of the chamber and the compartments.

In witness whereof, I have hereunto signed my name in the presence of two subscribing witnesses.

RALPH H. UPSON.

Witnesses:
J. E. KEATING,
PHILIP E. BARNES.